United States Patent [19]
McCoy

[11] 4,059,285
[45] Nov. 22, 1977

[54] HOME SHOPPING CART
[76] Inventor: Willie McCoy, P.O. Box 108, Wakefield Station, Bronx, N.Y. 10466
[21] Appl. No.: 721,335
[22] Filed: Sept. 8, 1976
[51] Int. Cl.² ............................................. B62B 11/00
[52] U.S. Cl. .................................... 280/651; 280/654
[58] Field of Search ............... 280/651, 652, 654, 655, 280/47.37, 47.26

[56] References Cited
U.S. PATENT DOCUMENTS

| 2,947,546 | 8/1960 | Berlin | 280/652 |
|---|---|---|---|
| 3,774,929 | 11/1973 | Stanley | 280/651 |
| 3,827,707 | 8/1974 | Bierman | 280/654 |
| 3,866,934 | 2/1975 | Braun | 280/655 |

Primary Examiner—Robert R. Song
Attorney, Agent, or Firm—Leonard W. Suroff

[57] ABSTRACT

A shopping cart having a substantially vertically extending main frame with laterally spaced main wheels rotatably mounted at the lower end of the main frame for movemment of the cart along a supporting surface is provided. Auxiliary frame means is articulately connected to the main frame for movement relative thereto between a closed position substantially coplanar with the main frame to an open position where the auxiliary frame projects forwardly from the main frame. An auxiliary wheel frame is provided having a pair of auxiliary wheels at one end thereof and articulately connected to the auxiliary frame means and being adapted, in the extended position of the latter, to engage the supporting surface along which the cart is movable at locations spaced forwardly from the main wheels. Handle means adapted to be gripped by the user is provided with mounting means for removably coupling the handle means to the auxiliary wheel frame so as to obtain angular adjustment thereof for the convenience of the user of the cart. The relative angular relationship of the handle means to the auxiliary wheel frame may vary for each user. In addition, extension means is operatively associated with the handle means to vary the length thereof between the mounting means and the free end thereof.

8 Claims, 6 Drawing Figures

U.S. Patent    Nov. 22, 1977    4,059,285
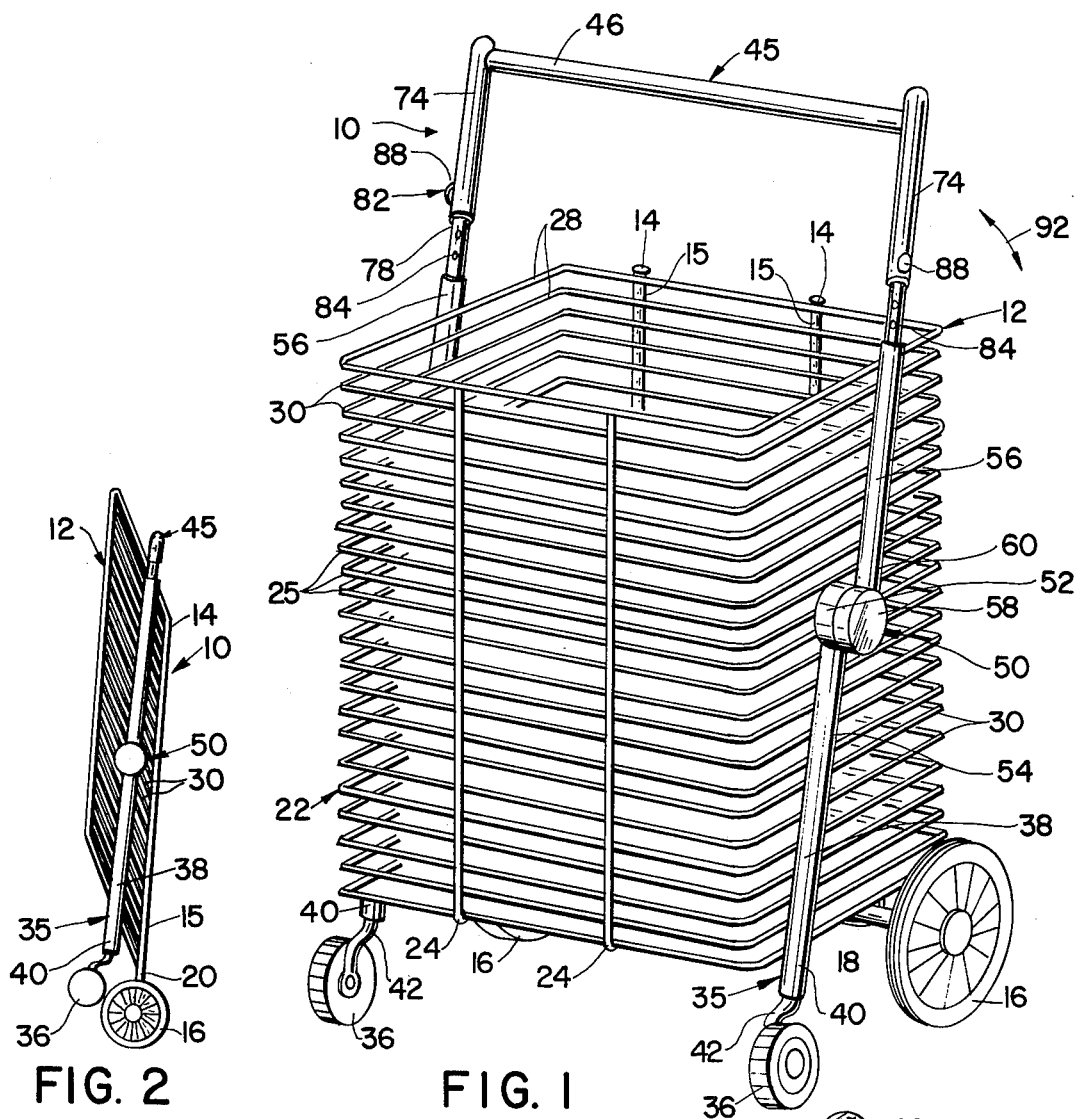
FIG. 1
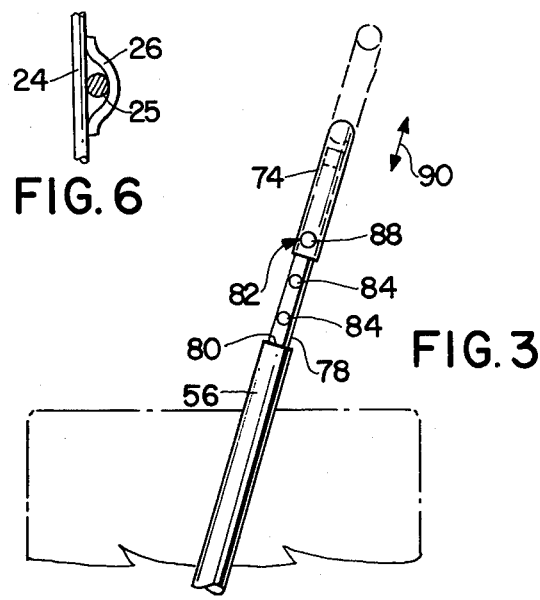
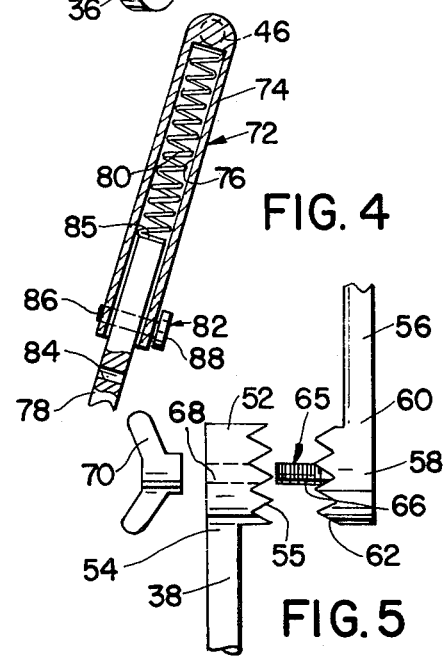

HOME SHOPPING CART

BACKGROUND OF THE INVENTION

The present invention relates to a shopping cart designed for use in shopping or for similar purposes.

There has been previously proposed a variety of wheeled shopping carts that can be collapsed or folded into a substantially flat unit as illustrated in U.S. Pat. Nos. 3,191,956 and 3,388,920. Notwithstanding the above inventions, the applicant has found it desirable to provide a shopping cart having certain important additional features not found in the above referenced patents.

In particular, for apartment living it has been found most desirable to be able to remove the handle from the cart for storage. In addition, due to the fact that different people of different height will purchase the cart, then it is desirable to be able to tilt the handle at different angles as well as adjust the height of the handle.

OBJECTS OF THE INVENTION

An object of the present invention is to provide a wheeled shopping cart having a novel handle structure such that it may be angularly positioned relative to the body of the cart.

Another object of the present invention is to provide a shopping cart in which the height of the handle from the wheels thereof may be adjusted.

Other objects and advantages of the present invention will become apparent as the disclosure proceeds.

SUMMARY OF THE INVENTION

A shopping cart having a substantially vertically extending main frame with laterally spaced main wheels rotatably mounted at the lower end of the main frame for movement of the cart along a supporting surface is provided. Auxiliary frame means is articulately connected to the main frame for movement relative thereto between a closed position substantially coplanar with the main frame to an open position where the auxiliary frame projects forwardly from the main frame. An auxiliary wheel frame is provided having a pair of auxiliary wheels at one end thereof and articulately connected to the auxiliary frame means and being adapted, in the extended position of the latter, to engage the supporting surface along which the cart is movable at locations spaced forwardly from the main wheels.

Handle means adapted to be gripped by the user is provided with mounting means for removably coupling the handle means to the auxiliary wheel frame so as to obtain angular adjustment thereof for the convenience of the user of the cart. The relative angular relationship of the handle means to the auxiliary wheel frame may vary for each user. In addition, extention means is operatively associated with the handle means to vary the length thereof between the mounting means and the free end thereof. In this manner both the height of the handle means and the angular relationship thereof may be adjusted.

BRIEF DESCRIPTION OF THE DRAWINGS

Although the characteristic features of this invention will be particularly pointed out in the claims, the invention itself, and the manner in which it may be made and used, may be better understood by referring to the following description taken in connection with the accompanying drawings forming a part hereof, wherein like reference numerals refer to like parts throughout the several views and in which:

FIG. 1 is a perspective view of the shopping cart in the open position thereof;

FIG. 2 is a side view of the shopping cart in the partially closed position thereof;

FIG. 3 is a side view of the upper portion of the shopping cart illustrating the adjustability of the handle means;

FIG. 4 is a sectional view of a portion of the handle means;

FIG. 5 is an exploded fragmentary view illustrating the mounting means of the invention; and FIG. 6 is a fragmentary view illustrating the structure of the auxiliary frame means.

DETAILED DESCRIPTION OF THE DRAWINGS

Referring to the drawings, there is illustrated in FIGS. 1-6 a shopping cart 10 having a body 12 that includes a substantially vertically extending main frame 14 which is illustrated to consist of a pair of frame members 15. In addition, laterally spaced main wheels 16 are rotatably mounted on a transversely extending shaft 18 that is mounted at the lower end 20 of the main frame 14. In this manner, the cart 10 can move along a supporting surface. The body 12 may further include auxiliary frame means 22 articulately connected to the main frame 14 for movement relative thereto between a closed position, as illustrated in FIG. 2, substantially coplanar with the main frame 14 to an open position, as illustrated in FIG. 1, where the auxiliary frame 22 projects forwardly from the main frame 14.

The auxiliary frame 22 may include a pair of vertically extending support members 24 that are pivotally secured to horizontally extending front ribs 25 by a hinge member 26 as seen in FIG. 6. The rear ribs 28 are similarly secured to the main frame 14, and the side ribs 30 joined together with the front ribs 25 and rear ribs 28 form the basket of the shopping cart 10.

An auxiliary wheel frame 35 is provided having a pair of auxiliary wheels 36 at one end thereof and mounted so that they may readily swivel when the cart 10 is moved along a supporting surface. The wheel frame 35 is articulately connected to the auxiliary frame means 22 and being adapted such that in the extended open position thereof the wheels 36 extend forwardly of the main wheels 16. In this manner, the auxiliary wheel frame 35 which includes a pair of wheel supports 38, is adapted for movement between open and closed positions of the cart 10. The auxiliary wheels 36 are mounted at the lower end 40 of the respective wheel supports 38. A swivel arm 42 connects each wheel 36 to a respective wheel support 40. Pivotal movement between the side ribs 30 and the wheel supports 38 may be obtained as by using a hinge member 26, or other fastener that permits angular movement to be obtained in a manner well known in the art.

For control of the cart 10 handle means 45 is provided and includes a handle bar 46 extending transversely of the frame means 22. The handle bar 46 is adapted to be gripped by the user of the cart 10. The handle means 45 is adapted to be angularly adjusted relative to the auxiliary frame means 22 and may also be adjusted in height.

Mounting means 50 is provided for removably coupling the handle means 45 to the auxiliary wheel frame 35 so as to obtain angular adjustment thereof for the convenience of the user of the cart 10. In this way the angular position can be adjusted depending upon how tall or how short the user is. The mounting means includes a mounting head 52 on each of the wheel supports 38 at the upper end 54 thereof. Each mounting head 52 includes a tooth-like surface 55. The handle means 45 includes a pair of legs 56 with a handle head 58 at the lower end 60 thereof. The handle head 56 includes a complementary tooth-like surface 62 so as to have the surfaces 55 and 62 mate with each other, such that the handle means 45 may be positioned at different angular positions relative to the wheel supports 38.

Clamping means 65 is provided for removably securing each pair of respective mounting heads 52 and 58 to each other. The clamping means includes a threaded member 66 extending outwardly from one of the mounting heads, for example from the handle head 58 and extending through an aperture 68 within the mounting head 52 and to mate with a wing nut 70 that would normally be positioned within the auxiliary frame means 22. If desired, the handle means 45 may be totally removed from coupling relationship with the auxiliary wheel frame 22.

To obtain the desired vertical adjustment as to the height of the handle means 45, extension means 72 is provided and operatively associated with the handle means 45 to vary the length thereof. The handle means 45 includes a pair of spaced apart arms 74 with the transversely extending handle bar 46 joining the arms 74 together. Each arm 74, as seen in FIG. 4, includes an axially extending bore 76. Each leg 56 may include an extension member 78 extending from the upper end 80 thereof. The extension member 78 being of a diameter to extend in telescopic relationship with the bore 76 of each arm 74. A spring 80 is mounted within each bore 76 to apply a force between the arms 74 and the legs 56. Coupling means 82 is adapted to retain the handle bar 46 in different extended positions relative to the legs 56. Each of the extension members 78 includes transversely extending apertures 84 adjacent the free end 85 thereof. The coupling means 82 includes a pair of pins 86, one for each pair of mating legs 56 and arms 74. Each pin 86 may further include a head 88 adapted to be readily grasped by the user for removal from its respective aperture 84 as the handle bar 46 is pressed downwardly, to overcome the resistance of spring 80, until alignment of different respective apertures 84 is obtained. When the alignment is obtained, the pins 86 are inserted to retain the handle bar 46 in adjusted position.

Accordingly, a novel aspect of the present invention is that the height of the handle bar 46 may be adjusted as indicated by the double headed arrow 90. In addition, the angle of the handle means 45 is also adjustable in the direction of the double headed arrow 92. In this manner a shopping cart 10, primarily manufactured from metal, may be easily adjusted in the manner described above.

Although an illustrative embodiment of the invention has been described in detail herein with reference to the accompanying drawings, it is to be understood that the invention is not limited to the precise embodiment and that various changes and modifications may be effected therein without departing from the scope or spirit of the invention.

I claim:
1. A shopping cart, comprising:
a. a substantially vertically extending main frame,
b. laterally spaced main wheels rotatably mounted at the lower end of said main frame for movement of the cart along a supporting surface,
c. auxiliary frame means articulately connected to said main frame for movement relative thereto between a closed position substantially coplanar with said main frame to an open position where said auxiliary frame projects forwardly from said main frame,
d. an auxiliary wheel frame having a pair of auxiliary wheels at one end thereof and articulately connected to said auxiliary frame means and being adapted, in said extended position of the latter, to engage the supporting surface along which the cart is movable at locations spaced forwardly from said main wheels,
e. handle means adapted to be gripped by the user,
f. mounting means for removably coupling said handle means to said auxiliary wheel frame so as to obtain angular adjustment thereof for the convenience of the user of the cart, such that the relative angular relationship of said handle means to said auxiliary wheel frame may vary,
g. extension means operatively associated with said handle means to vary the length thereof between said mounting means and the free end thereof, and
h. said handle means includes:
i. a pair of legs removably secured to said mounting means at substantially one end thereof,
ii. a handle bar extending transversely across said auxiliary frame and adapted to be gripped by the user of the cart,
iii. a pair of arms having a bore therein and connected to said handle bar in spaced relationship with each other, said legs adapted to extend in telescopic relationship to said arms and within said bores,
iv. a spring in each said bore to apply a force between said arms and said legs, and
v. coupling means adapted to retain said handle bar in different extended positions relative to said legs.

2. A shopping cart as in claim 1, wherein said auxiliary wheel frame includes:
a. a pair of wheel supports having said auxiliary frame pivotally mounted with respect thereto and movable between the open and closed positions, and
b. said auxiliary wheels mounted at the lower end of said wheel supports.

3. A shopping cart as in claim 2, wherein said auxiliary wheels are adapted to swivel relative to said wheel supports.

4. A shopping cart as in claim 1,
a. wherein each of said legs includes transversely extending apertures adjacent the free end thereof, and
b. wherein said coupling means includes a pair of pins, one for each pair of said legs and said arms, to extend within a selected aperture so as to obtain an adjustment of the length of said handle bar from said mounting means.

5. A shopping cart as in claim 4, wherein each said leg includes an extention member of reduced diameter having said apertures therein, with the outer diameter of said legs and said arms being of the same diameter, such that in the lowermost position of said handle bar said extention means is fully enclosed.

6. A shopping cart as in claim 5, wherein each said pin includes a head adapted to be readily grasped by the user for removal from its respective apertures as said handle bar is pressed downwardly until alignment of different respective apertures is obtained and said pins are inserted to retain said handle bar in adjusted position.

7. A shopping cart as in claim 6, wherein said mounting means includes:
 a. a mounting head on each of said wheel supports at the upper end thereof having a tooth-like surface,
 b. a handle head at the lower end of each said leg having a complementary tooth-like surface, so as to have said surfaces mate with each other such that said handle means may be positioned at different angular positions relative to said wheel supports, and
 c. clamping means removably securing each pair of said respective mounting heads and handle heads to each other.

8. A shopping cart as in claim 7, wherein said handle means may be totally removed from coupling relationship with said auxiliary wheel frame.

* * * * *